United States Patent [19]

Weitzman et al.

[11] Patent Number: 4,829,428

[45] Date of Patent: * May 9, 1989

[54] BEVERAGE CONTAINER SORTING, ACCOUNTING, AND DISPOSAL METHOD WITH COMPARTMENTALIZED HAMPER AND CAN CRUSHER

[75] Inventors: David H. Weitzman, Waterville; Jeffrey M. Young, Utica, both of N.Y.

[73] Assignee: Empire Returns Corporation, Utica, N.Y.

[ * ] Notice: The portion of the term of this patent subsequent to May 19, 2004 has been disclaimed.

[21] Appl. No.: 908,218

[22] Filed: Sep. 17, 1986

Related U.S. Application Data

[63] Continuation-in-part of Ser. No. 753,916, Jul. 11, 1985, Pat. No. 4,667,291.

[51] Int. Cl.$^4$ ..................... G06F 15/21; G06K 15/00
[52] U.S. Cl. .................................. 364/401; 364/403; 364/406; 235/383; 235/385; 209/930
[58] Field of Search ............................... 364/400–401, 364/403–406, 464, 466, 472–473, 478, 200 MS File, 300 MS File, 900 MS File; 29/403.1, 403.3, 403.4; 65/10, 23, 28; 209/522, 523–527, 552, 592, 606, 608, 610, 636, 655–656, 659, 243, 14 246, 370–373, 928, 930; 235/383, 385

[56] References Cited

U.S. PATENT DOCUMENTS

| | | | |
|---|---|---|---|
| 3,605,243 | 9/1971 | Oster | 29/403 |
| 3,613,215 | 10/1971 | Uhl | 29/403 |
| 4,037,302 | 7/1977 | Hollander | 29/403 |
| 4,248,389 | 2/1981 | Thompson et al. | 209/524 X |
| 4,373,435 | 2/1983 | Grevich | 209/930 X |
| 4,406,411 | 9/1983 | Gall et al. | 29/403.3 X |
| 4,440,284 | 4/1984 | De Woolfson | 209/930 X |
| 4,468,847 | 9/1984 | Bowman et al. | 29/403.4 X |
| 4,558,212 | 12/1985 | Hampson | 235/383 |
| 4,591,705 | 5/1986 | Toudou | 235/385 X |
| 4,610,359 | 9/1986 | Müller | 364/478 X |

OTHER PUBLICATIONS

Rockefeller Commission, The New York Returnable Beverage Container Law: The First Year, Mar. 15, 1985.
National Soft Drink Assoc., Survey of Third-Party Pickup Services for Beverage Containers Returned to Retail Stores in States with Mandatory Deposit Legislation, Aug. 1983.
Price Chopper Supermarkets, Dealer Letter of Dec. 10, 1982.
Harrington, "Computer to Slash Bottle-Return Steps", Supermarket News, Apr. 4, 1983.
"Area Grocer Simplifies Bottle Law", Albany Times-Union, Mar 26, 1983.
Empire Returns Corp., Proposed Contract with Dealer, 1983.

*Primary Examiner*—Gary V. Harkcom
*Attorney, Agent, or Firm*—Wall and Roehrig

[57] ABSTRACT

Returnable beverage containers, on which a deposit has been paid at purchase, are returned to a return center for the containers, for example, in a retail outlet. At the return center, the returned containers are sorted and counted, and data about them are entered on a computerized cash register. A clerk at the return center sorts and counts the containers by brand, size, material, and amount of deposit, and the cash register produces a credit slip for the customer. At the return center, the beverage containers are sorted by material and placed into respective receptacles therefor, based upon scrap grade, that is, material type, but without regard for the brand. When the receptacles are full, they are emptied into compartmentalized, locked hampers, which, when filled, are transported to a transfer station where the contents of each hamper compartment are weighed and then processed. The computerized cash register records the number of containers returned for each brand and associates this with the respective distributors. A can crusher is located at the beverage return center, and has a vibratory hopper. Removable bulkheads between the compartments of the hamper can be adjusted for seasonal or demographic variations in the mix of aluminum, clear glass, and colored glass containers that are returned.

20 Claims, 9 Drawing Sheets

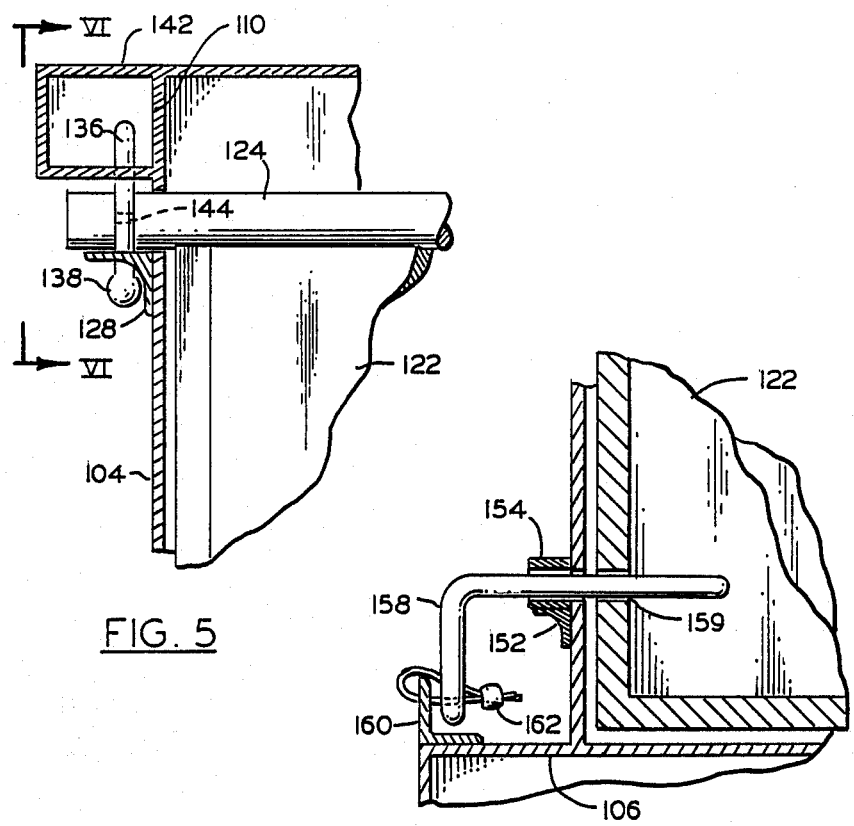
FIG. 5
FIG. 7
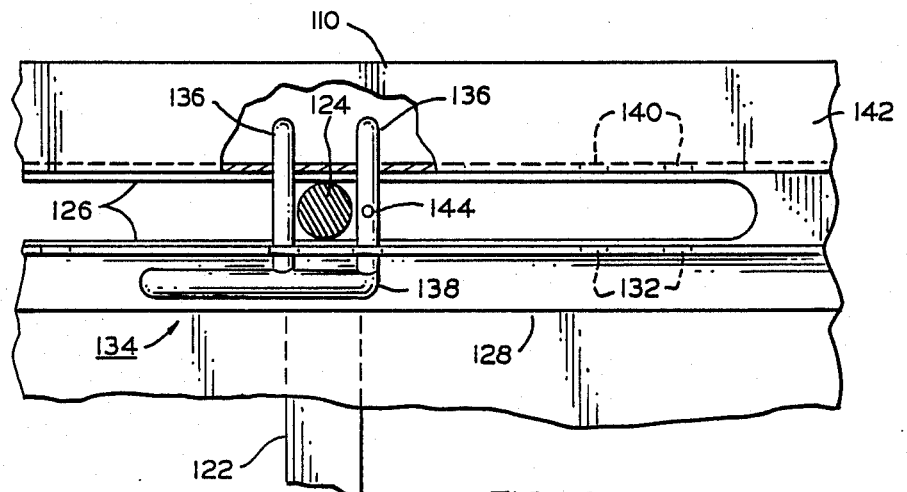
FIG. 6

BEVERAGE CONTAINER SORTING, ACCOUNTING, AND DISPOSAL METHOD WITH COMPARTMENTALIZED HAMPER AND CAN CRUSHER

RELATED APPLICATION DATA

This is a continuation-in-part of our co-pending U.S. patent application Ser. No. 753,916, filed July 11, 1985 now U.S. Pat. No. 4,667,291.

BACKGROUND OF THE INVENTION

This invention relates to methods and apparatus for sorting and accounting for items and is more particularly directed to a novel and advantageous method, especially at a retail outlet, of sorting and accounting for returnable beverage containers in connection with their redemption by consumers.

In several states, laws have been enacted that specify that each container of carbonated beverages, mineral water, beer or other malt beverage sold in the state must carry with it a minimum deposit. This deposit, which is usually five cents per container, is paid initially by the retail outlet or dealer to the distributor who may be the brewer, bottler, or more often, wholesaler. The dealer, in turn, must charge this deposit to the purchaser of the beverage.

The purchaser can redeem the deposit at any retail outlet that carries the brand of beverage in question by returning his empty container to the outlet. Under most state bottle return laws, it is the legal responsibility of the distributor to pick up the empty containers and to pay the retail outlet the amount of the deposits plus a handling fee that may be about one-and-one-half cents per container. This procedure, while environmentally beneficial, places an undesired burden on retail outlets and distributors. Quite often, the cost to the dealer or retailer exceeds the alloted handling fees, largely because of labor costs.

Many attempts have been made to streamline the returns procedure and render it more efficient. These attempts include, for example, the so-called "reverse vending machine" into which a consumer feeds returnable cans which are automatically counted and credited to the consumer.

The present invention is more closely directed to a so-called third-party collection and redemption system in which a company independent of the distributors and retailers accounts for the returnable bottles and cans, and carts off the returned containers from the retailer's facility. The third-party collection agent notifies each distributor of the number of cans and bottles collected, collects a fee from the retailers for disposing of the returnable containers, and credits the distributors for the scrap value of the container materials which are sold to a recycler.

OBJECTS AND SUMMARY OF THE INVENTION

It is an object of the invention to provide a collection and sorting method and apparatus which facilitates, at the retailer end, the collection of returnable cans, and renders their removal and transport more efficient.

It is another object of this invention to provide a collection and sorting method and apparatus which adapt for and accommodate seasonal and demographic variations in the ratios of sales of clear bottles, colored bottles and cans.

The method of this invention is a computerized third-party system which involves a large number of grocery stores, supermarkets, beverage retailers, and distributors for the carbonated beverages sold therein.

In this method, the retailers are provided with a programmable computerized cash register which keeps track of the quantity of containers that customers bring in for redemption by brand and by type of container (i.e., glass, aluminum, plastic). The retailer is also provided with a compartmentalized hamper for holding the returned containers, these having compartments for clear glass bottles, colored glass bottles, and aluminum cans. The partitions between successive compartments can be moved to adjust for the ratio of cans to bottles, or clear to colored bottles, etc.

Under New York State law, for example, as under the laws of several other states, each container for carbonated drinks, mineral water, beer, or other malt beverages, whether in glass, plastic, aluminum, or steel containers, sold in the state at any outlet, for consumption on or off premises, must carry with it a minumum five cent deposit. That deposit is paid initially by the retail outlet to the distributor, who may, for example, be a brewer, a bottler, or a wholesaler. The retail outlet in turn must charge this deposit to each purchaser. The purchaser can redeem the empty container for the deposit at any retail outlet that sells that brand even if he did not purchase the filled beverage containers there. Under this procedure, it is the legal responsibility of the distributor to pick up the returned empties and pay to the dealer the deposit amounts plus a handling fee of one-and-one-half cents per container. The containers are labeled with deposit information. The labels often indicate the several states where the beverage may be sold and where the containers may be redeemed.

The system of this invention facilitates this entire process and avoids the need for the distributors to pick up the empties and to dispose of them. A Beverage Return Center is set up in each store. This Beverage Return Center is comprised of a twelve-foot long by three-foot wide counter (size s approximate) which is used for the sorting of containers by scrap grade, i.e., clear glass bottles, colored glass bottles, aluminum cans, and plastic bottles. The counter has openings, and respective 44-gallon plastic barrels or similar receptacles for the various scrap grades to be placed under the respective openings.

Also at the Beverage Return Center is a special electronic cash register (ECR) similar to the ones used in fast food restaurants. The ECR has programmed in it the container type, brand, and size for each individual beverage item handled in the store. The ECR also "knows" which distributor handles which brands of beverage. The ECR serves a dual function: It prints a customer receipt for the containers returned and it maintains a permanent record of the number of containers returned for each individual distributor. At the end of each week, the store has a record and provides each distributor with a printout detailing the amount owed to the store for refunds of deposit. Software in the ECR allocates the deposit for containers of a given brand to the appropriate distributor.

As soon as the plastic barrels become filled at the Beverage Redemption Center, store personnel empty the barrels into compartmentalized locked holding bins of the hamper, the latter being on premises but outside the building; when filled, the hamper is picked up by the third-party agent and transported to a transfer station. The weight of containers in each bin is determined and the containers are crushed and processed for recycling. Then the hamper is returned.

Copies of the ECR tapes are sent to the third-party agent. Based on these data, the appropriate distributors are billed for the agent's fees and are credited for the scrap value of their containers. Security of the system is guaranteed in two ways:

1. An independent accounting firm audits store procedures as well as the third-party agent's activities. The accounting firm also uses "mystery shopper" techniques to test the accuracy of data entry.

2. The weight of containers picked up by the third-party agent are compared to the theoretical weight calculated in the ECR and based on the number of returns of each scrap grade.

These two procedures together disclose fraud or gross mismanagement, if any, of the retailer.

According to an object of this invention, a method of redeeming and disposing of returnable empty beverage containers is presented, in which a consumer returns aluminum cans, glass bottles, and other containers to a return center, for example in a grocery supermarket, for redemption and return of the refundable deposit. At the counter, a clerk counts the containers delivered by the consumer to the return center by brand, size and material, and then enters the count of the containers of each brand, size and material into a computerized cash register that is associated with a program data processer. The computerized cash register computes for the consumer credit data with returned container information indicating the refund of deposit due the consumer based upon the count or number of containers returned of each type, and the consumer is then provided with a credit slip in the form of a cash register receipt. The computerized cash register and programmed data processor keep track of the number of containers of each type that have been returned for each brand, and then associate each brand with its respective distributor, so that the supermarket can be reimbursed for the redemptions.

The clerk then sorts the redeemed glass and aluminum containers according to material and without regard for brand, and places the returned glass containers so sorted into separate receptacle bins provided for that purpose at the return center. The redeemed aluminum containers are placed into a can crushing unit at the beverage return center, which automatically crushes the cans to reduce their volume and then automatically deposits these crushed cans in a crushed can receptacle. When these receptacle bins are filled, their contents of glass containers and crushed cans are transferred to respective locked compartments of an exterior compartmentalized hamper that is usually kept outside at the rear or side of the supermarket. This hamper has moveable bulkheads dividing the locked compartments from one another. These bulkheads are adjustable to change the relative size of the respective compartments to conform with the relative volume of containers of the respective types of materials stored in each of the compartments. This is a beneficial feature because there is a significant seasonal variation in mix of aluminum and glass containers from summer to winter, and significant variations from one community to another.

When any one of the compartments is completely filled, the hamper is placed on a truck bed and the truck is driven to a recycle center. The respective weights of the contents of each of the locked containers is measured at the recycle center. First the full hamper is weighed. Then, an end door of the hamper is released, and the contents of the compartment between the end door and the first of the moveable bulkheads is dumped. The hamper is weighed again. Then, a releasable lock member is removed from the first of the bulkheads, permitting it to swing when the hamper is dumped, and then the contents of the next compartment are dumped. After this, the hamper is again weighed.

Each remaining bulkhead is successively released, and the contents of the compartment behind it dumped, following which the hamper again is weighed, until all of the compartments in the hamper have been emptied. The weight difference between successive weighings of the hamper give the measured actual weight of the contents of each of the compartments.

From the computerized cash register and the associated data processor, the total number of the empty containers of each respective material type is calculated, and a theoretical weight of each of the hamper compartments is computed, based on the number of containers of each such type returned. An audit is carried out based on a comparison of the actual measured weight with the theoretical calculated weight.

The computerized cash register and data processor associate the number of returned containers of each brand with the respective distributor, and also calculate a credit for the retailer from each distributor for the number of containers returned for which that distributor has responsibility.

The metal containers are crushed in the store, but the glass containers are placed, intact, into the receptacles in the store. The glass containers are preferably not crushed or fractured, except for an insubstantial amount of breakage, until after being transferred to the hamper. It has been found that the aluminum cans maintain their integrity even when crushed, so that residual beverage in the container will not leak out and attract insects. However, glass containers do not have this property, so they are left unbroken in the store and any residual beverage stays within the container until after they are transferred outside.

Preferably, the can crushing unit has a vibratory hopper to receive the redeemed aluminum can containers, including an electric vibrator for vibrating the hopper so that the containers are consistently fed from the hopper to an inlet of the can crushing unit, and a compartment beneath the can crushing unit reposes the receptacle bin for the crushed cans.

The above and many other objects, features, and advantages of this invention will become more fully understood from the ensuing detailed description of a prefered embodiment, which should be considered in connection with the accompanying drawing.

BRIEF DESCRIPTION OF THE DRAWING

FIG. 5 is a sectional view taken along the line V—V of FIG. 4

FIG. 6 is a sectional view taken along the line VI—VI of FIG. 5.

FIG. 7 is a sectional view taken along the line VII—VII of FIG. 4.

DETAILED DESCRIPTION OF THE PREFERRED EMBODIMENT

Figure 1:
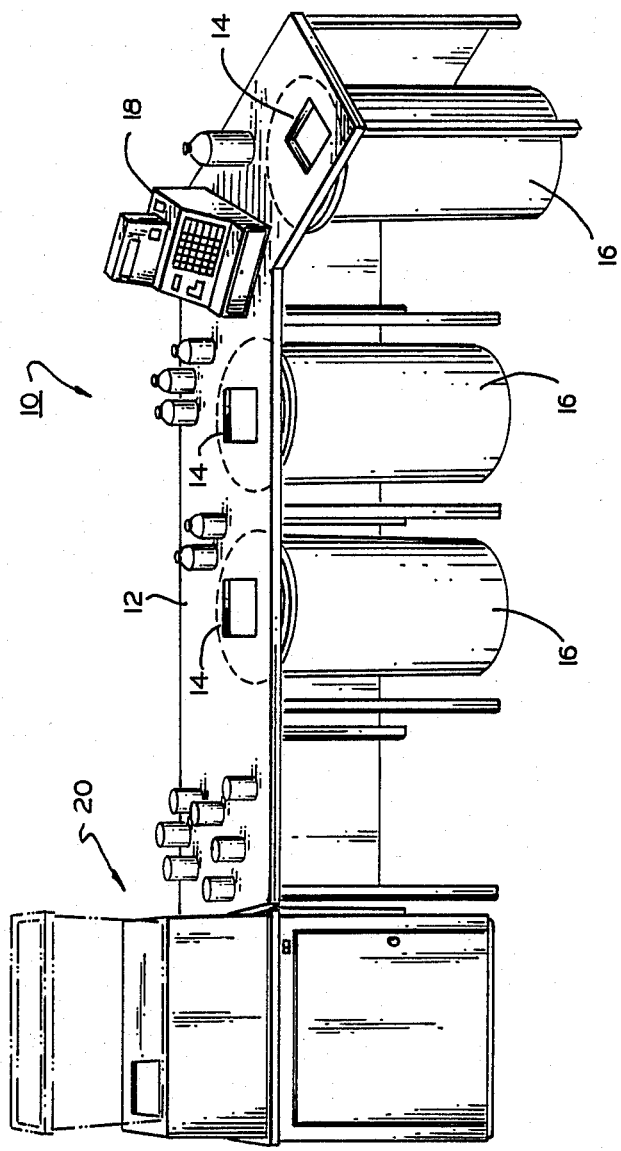
FIG. 1 is a perspective view of a beverage return counter according to this invention.

FIG. 1 shows a beverage return center, of the type which is typically found in a supermarket or redemption center which may have a large turnover in the number of containers sold and redeemed. At the beverage return center, there is a beverage return counter 10 having a flat countertop 12 on which the returned containers are placed by the customer, and with respective openings 14 therein for plastic, one-way clear glass, and one-way colored glass containers. Receptacles, which are favorably forty-four gallon plastic barrels 16, are disposed beneath the countertop 12 at the positions of the openings 14. A computerized cash register 18 sits atop the countertop 12. A can crushing unit 20 at one end of the return counter 10 serves to reduce the volume occupied by the returned aluminum cans.

Beer and soft drink containers are placed by the consumer onto the countertop 12, and the data relating to the number of cans of each particular brand, the number of clear glass bottles of each brand, the number of colored glass bottles of each brand, and the number of plastic containers for each brand are entered by a clerk onto the computerized cash register 18. This can be done on the keyboard of the register 18, or by use of a bar code reader (not shown). The register 18 produces a cash register tape for the customer indicating the amount of store credit to be given to the customer for returning the redeemable containers. Refillable beer and soft drink containers are credited in a similar fashion, but the refillable containers are stored separately, as they must be returned to the distributor and thence to the bottler or brewer to be refilled.

Figure 2:
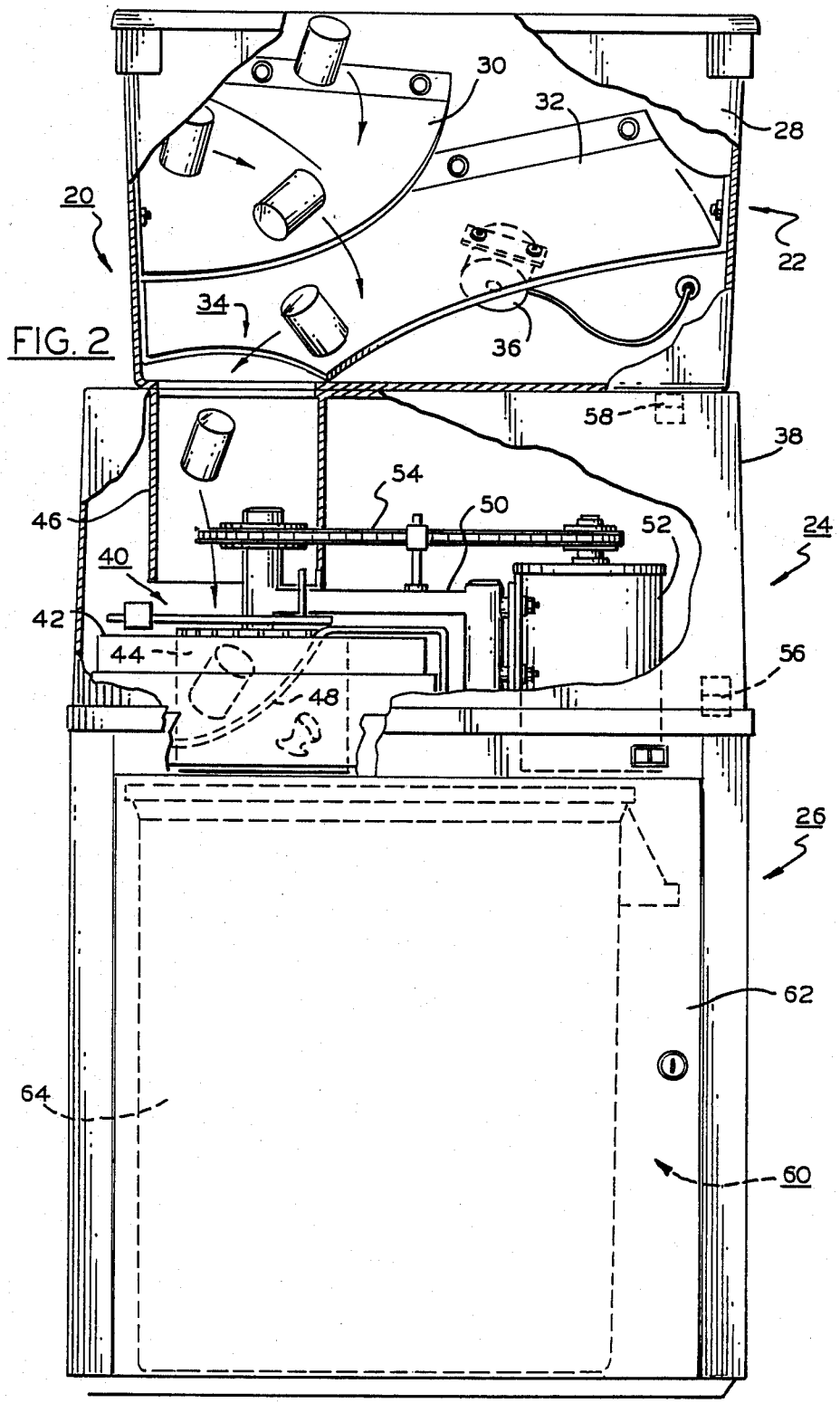
FIG. 2 is an elevation, partly cut away, of a can crushing unit according to an embodiment of this invention.
Figure 3:
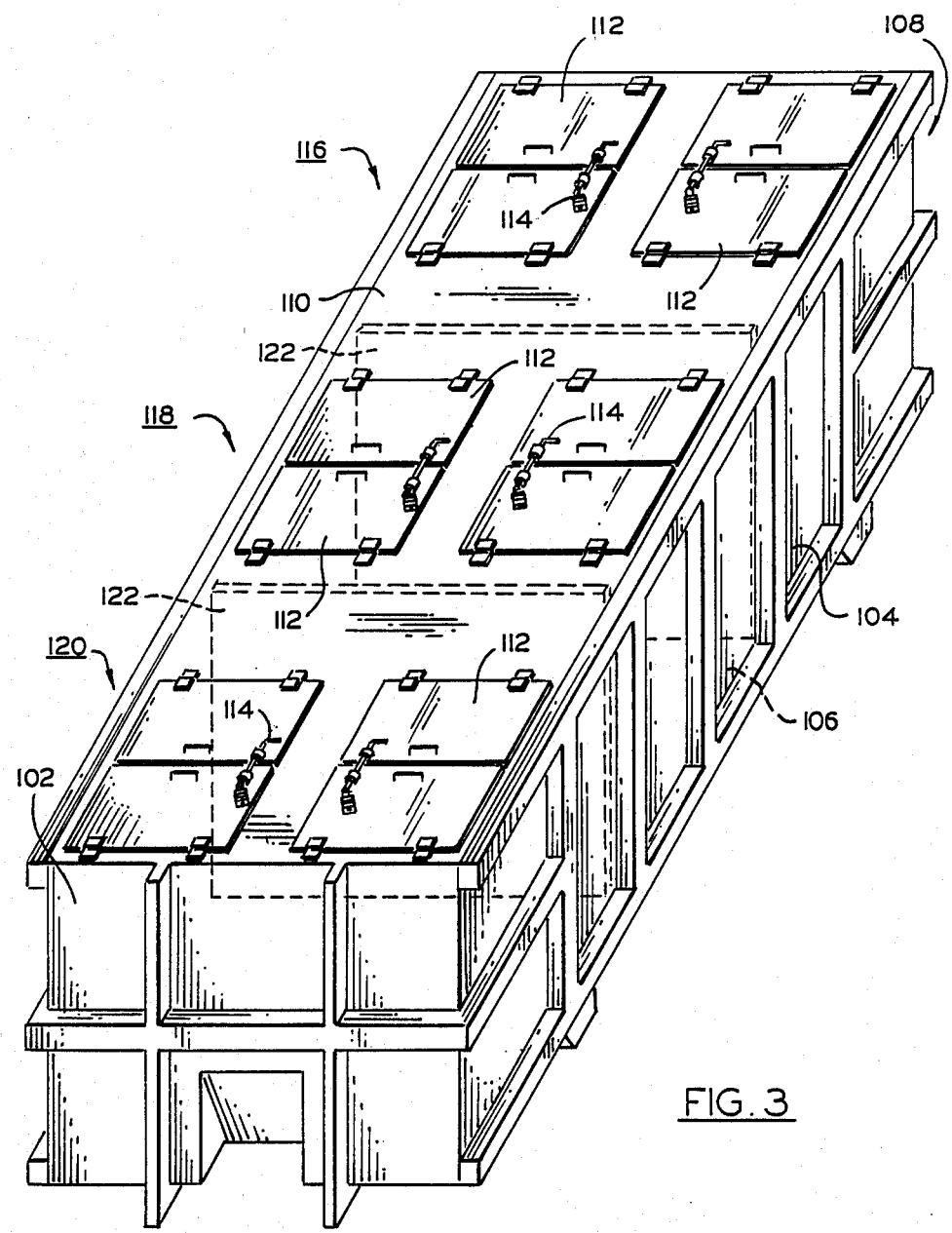
FIG. 3 is an isometric view of the compartmentalized hamper according to an embodiment of this invention.

As shown in FIG. 2, the can crushing unit 20 has a hopper 22 with an open top into which the store clerk deposits the aluminum cans. A can crushing mechanism 24 is disposed beneath the hopper 22, and a receptacle bin 26 is disposed beneath the crushing mechanism 24.

The hopper 22 is formed of a shell 28 with an upper baffle 30 and a lower baffle 32. The latter leads to an opening 34 through which the cans fall to the can crushing mechanism 24. A vibrator motor 36 is here attached to the underside of the lower baffle 32 and vibrates the hopper 22. The vibration prevents the cans from bridging together and jamming in the hopper 22.

The can crushing mechanism 24 has an outer housing 38 containing a rotating cylinder-type crushing machine 40. The latter is formed with an outer static cylinder 42 and inner rotating drum 44. These have vertical axes, but the axis of the drum 44 is offset from that of the cylinder 42. A guide member 46 disposed beneath the opening 34 leads the cans from the opening into the space between the cylinder 42 and the drum 44. A metal arm 48 projects downward into the space between the cylinder 42 and the drum 44 and guides the cans that fall therein so that they are carried into the narrow part of the space between the cylinder 42 and the drum 44, where they are crushed. The crushing machine 40 also has a frame 50 which suspends the rotating drum 44, a motor 52, and a belt drive 54 for transmitting power from the motor 52 to the drum 44.

An interlock switch 56 connects the housing 38 of the can crushing mechanism 24 with the receptacle bin 26 therebelow, and renders the motor 52 inoperative whenever the housing 38 is removed. A similar interlock 58 is provided between the housing 38 and the hopper 22, so that the motor 52 will not operate when the hopper 22 is removed.

The receptacle bin 26 has an enclosed compartment 60 with a lockable front door panel 62, and a removable receptacle 64 is disposed within the compartment 60 beneath the outlet of the crushing machine 40.

The crusher unit can have an automatic switch for the motors 36 and 52, for example, weight actuated or photoelectrically actuated. A manual switch can be used for this purpose as well.

With this device, the aluminum cans are crushed to about one-fifth of their original volume. Consequently, more returned cans can be transferred from the return counter per trip than if the cans were not so crushed.

The compartmentalized hamper employed according to this embodiment of the invention is shown in FIGS. 3–7. In this embodiment, the hamper is generally formed of a box-type trash container, or box 100 designed to load onto the flatbed of a truck for transport to a dumping or recycling site. This container or box 100 has a front wall 102, opposed side walls 104 a bottom 106, and a back 108 which is arranged as a hinged door that is normally locked shut. The front end wall 102 and the bottom 106 are provided with rollers and other known means 12 to permit loading of the box 100 onto a truck bed. A top 110 of this box 100 is provided with a series of pairs of locked doors 112, which are kept padlocked shut by means of locking bars 114. From the back to the front, the box has compartments 116, 118, and 120, with the compartment 116 of this embodiment being for aluminum cans, compartment 118 for colored glass bottles, and compartment 120 for clear glass bottles. Transverse bulkheads 122 serve as septa to separate the respective containers 116 from 118 and 118 from 120.

As shown in FIG. 5, the bulkheads each have a pivot rod 124 welded across the top thereof and extending outwardly through a slot 126 in the side wall 104 of the box. Support members 128 formed of angle braces each have a flange 130 protruding outward, and pairs of holes 132 are provided in the protruding flange 130 at a number of positions along its length. For each support member 128, a generally F-shaped pivot member 134 has a pair of round prongs 136 that project upwardly through the pair of holes 132 in the flange 130 of the support member 128, and a flat base member 138 which is disposed below the support flange 130. Similar pairs of holes 140, in registry with the holes 132, are provided in a box-like overlapping portion of the top 110. Also, as shown in FIG. 6, a hole 144 through one of the round prongs 136 receives a pin (not shown) to retain the pivot member 144 in place.

Each of the F-shaped pivot members 134 surrounds the protruding end of the rod 124 to define a pivot location about which the bulkhead 122 can swing. If this position is to be changed, the pivot member 134 is pulled downwards out of the holes 132 and 140, and then the bulkhead 122 and its pivot rod 124 can be slid along slots 126 to a position between another pair of holes 132, and the pivot member 134 replaced at the new location.

Figure 4:
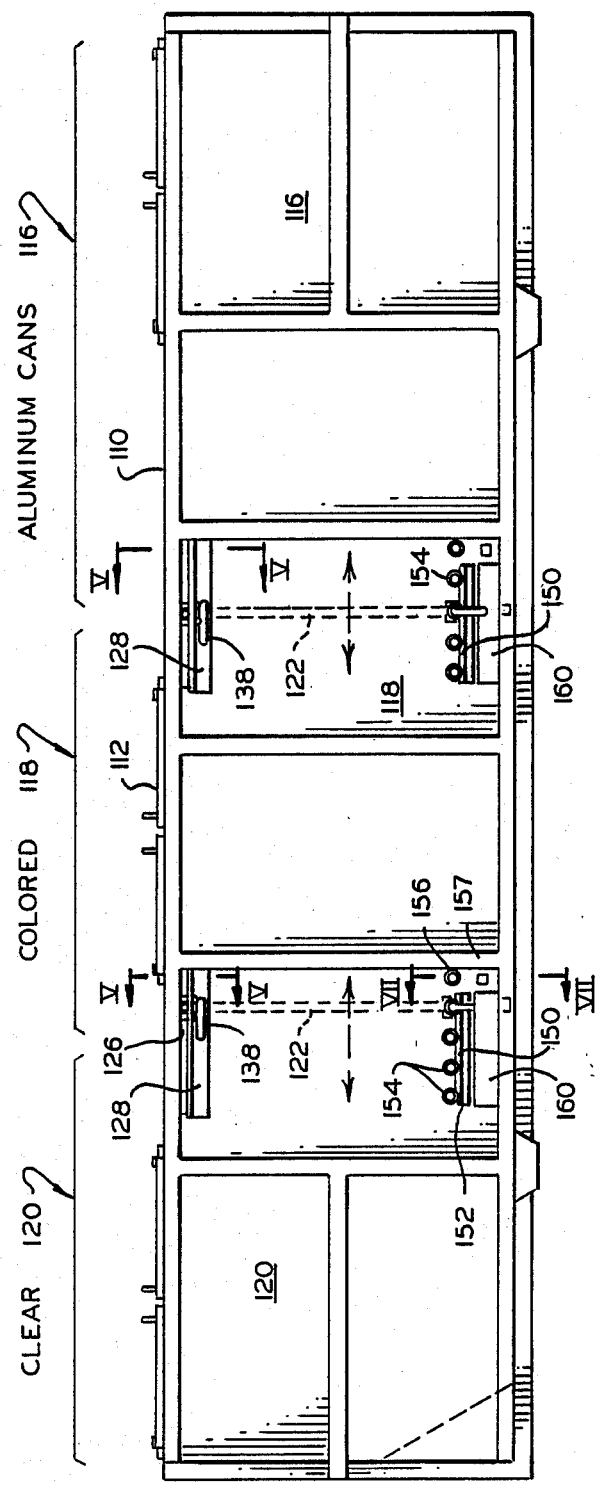
FIG. 4 is a side elevation of the hamper of FIG. 3.

As shown in FIGS. 4 and 7, the bulkheads 122 are held from swinging by means of lock rods and a lock support 150 disposed at the bottom of the side walls 104. Each lock support 150 is formed of an angle member 152 welded to the side wall 104 at the bottom thereof, with a plurality of pipe stubs or tubes 154 each spaced about six inches apart so as to be in vertical alignment with the positions of the pairs of holes 132 for the pivot member 134. An additional lock support 156 is disposed in line with the pipe stubs 154 adjacent a brace 157 on the side wall 104.

An ell-shaped lockrod 158 passes through one of the pipe stubs 154 and into an opening 159 in the bulkhead 122 to lock the bulkhead 122 against swinging motion. An angle member 160, having an apertured upstanding flange 161 is welded to the bottom of the box 100. A lead seal 162 has a wire passing through apertures in the flange 161 of the angle member 160 and through the end of the lockrod 158 to keep the lockrod 158 in place.

Figure 8:
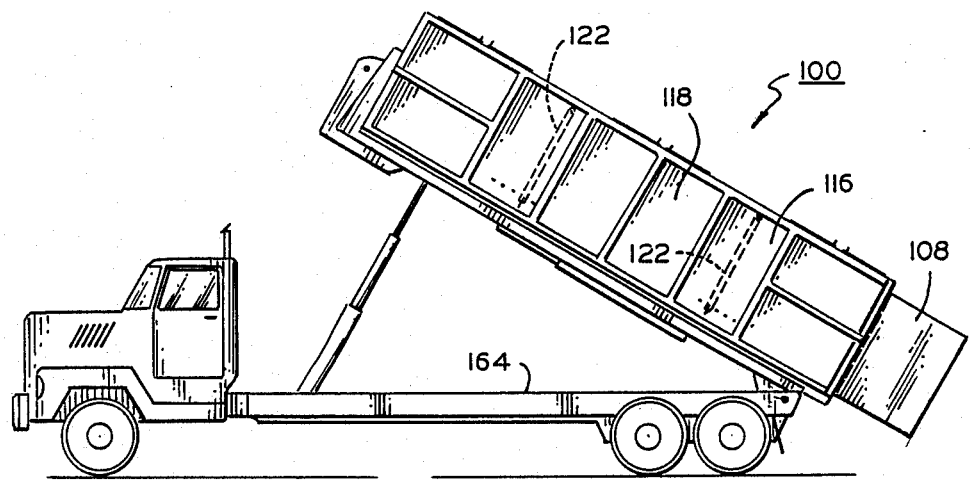
FIGS. 8, 9 and 10 illustrate the sequence for emptying the hamper of FIG. 4.

As aforesaid, when any of the compartments 116, 118, or 120 becomes completely filled, the third-party agent is called in, and the agent brings a flatbed truck 164 to load the box 100 and carry the same to a dumping or recycling site. At that location, the full box 100 is weighed, and then the hinged back gate 108 is opened, and the box 100 tilted, as shown in FIG. 8 to empty the crushed cans from the compartment 162.

Figure 9:
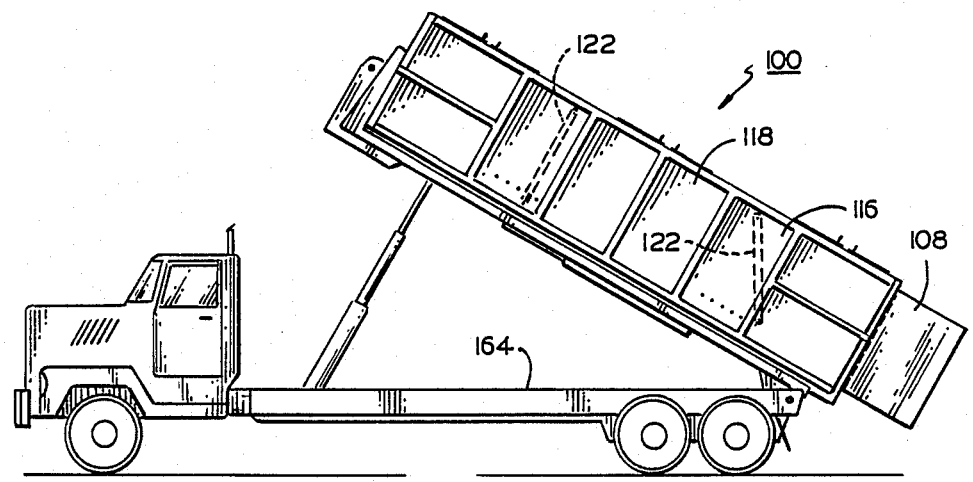
Figure 10:
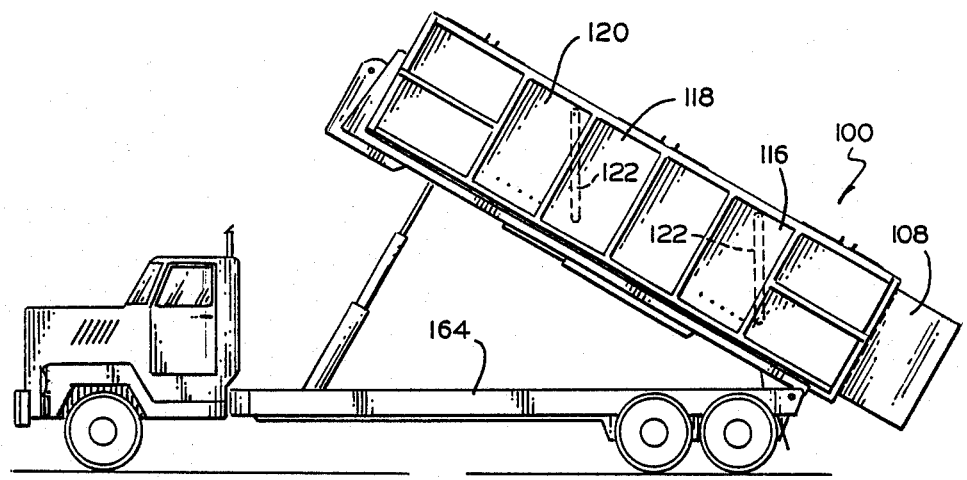

Thereafter, the box is again weighed, and the lock rods 158 removed from the rear bulkhead 122, so that the latter is permitted to swing. Then, the box 100 is again tilted, as shown in FIG. 9, and the colored glass bottles from the compartment 118 are dumped out. Again, the box 100 is weighed, the lock rods 158 removed from the forward bulkhead 122, and then the clear glass bottles from the compartment 122 are dumped as shown in FIG. 10.

The empty box 100 is weighed, and then the same is returned to the retailer. Upon return, or prior to return of the box 100 to the supermarket, the positions of the bulkheads 122 can be adjusted, and the lock rods 158 are replaced.

Figure 11A:
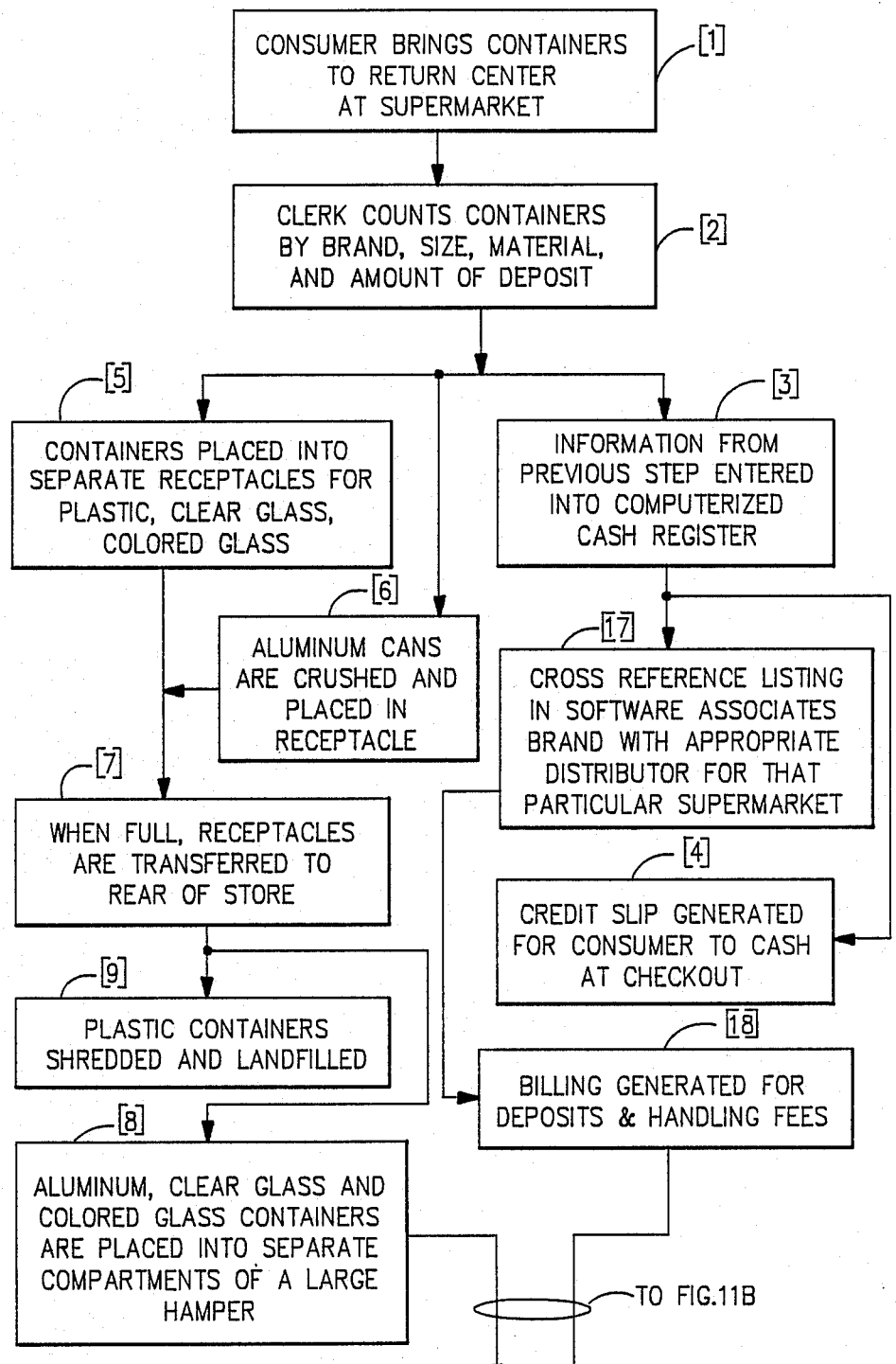
FIG. 11 is a flow chart of the process of this invention.
Figures 11, 11B:
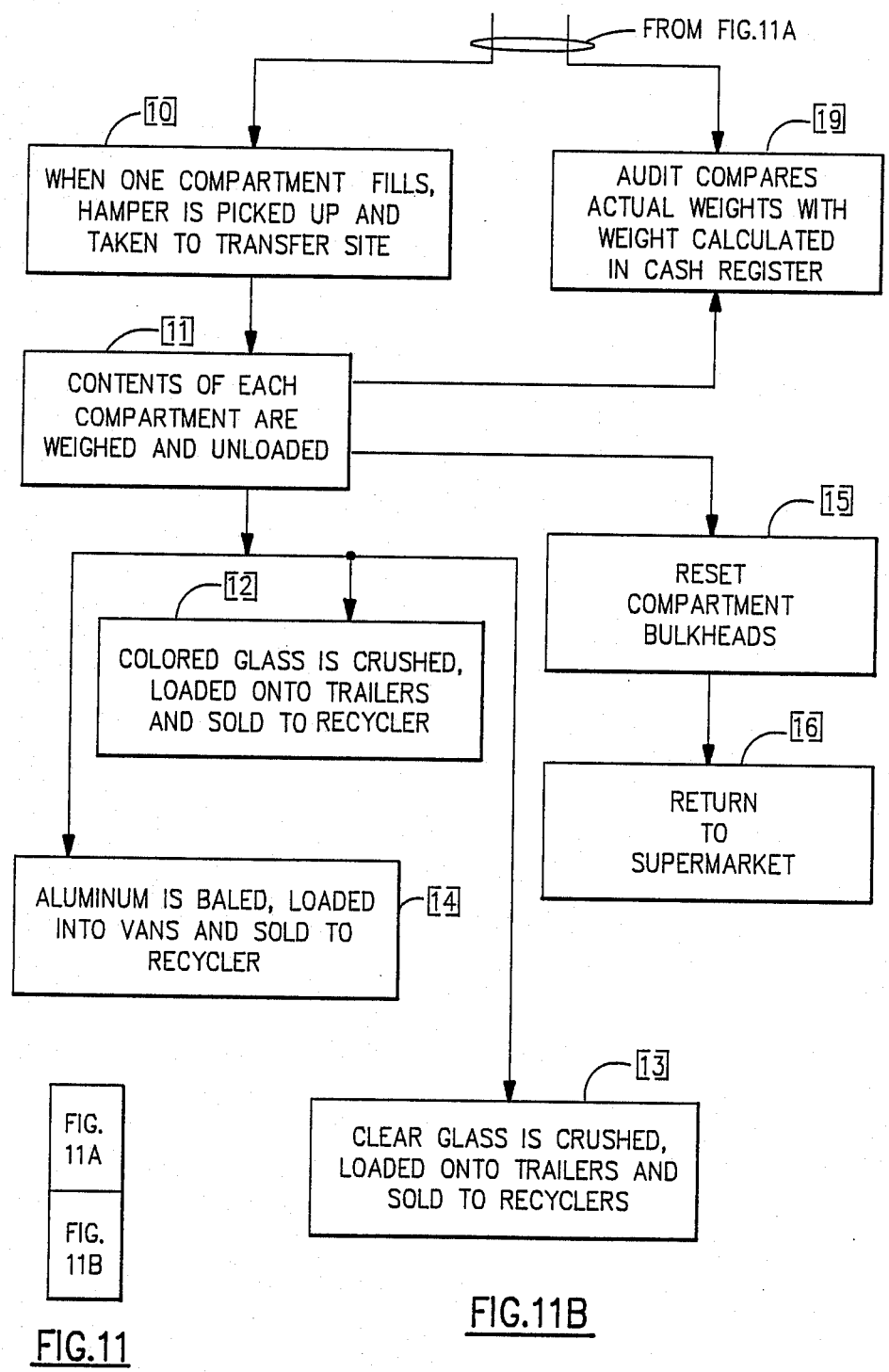

The flow chart of FIG. 11 illustrates the entire process, which can be briefly described as follows:

The method of this invention is set in motion by the consumer or purchaser, who brings his empty containers to the supermarket or other retailer in order to redeem his or her deposit. Upon arriving at the supermarket, the consumer brings the returned containers to the beverage return center, as in block [1]. At the return center, as mentioned above, the clerk can sort and count the returned containers as in block [2] with the containers being sorted according to brand, e.g. "Coca-Cola" soft-drink, "Matt's" beer, etc., and according to the type of material, such as aluminum, plastic, clear glass, or colored glass. If there are different amounts of deposit for the different sizes of containers, the clerk may also enter the size, for example 12 ounce, 16 ounce, 64 ounce, etc., and the amount of deposit.

The clerk enters his count of the returned containers, according to brand, size, and material as noted above, into the computerized cash register 18, as in block [3], and the computerized cash register 18 immediately produces a credit slip (block [4]) which the consumer can cash at the checkout counter. At that time, the clerk places the plastic, clear glass and colored glass containers into the respective receptacles 16 (block [5]) and places the cans into the can crusher block (block [6]). When any of these receptacles 16 or 64 are filled, they are transferred away from the beverage return center into the rear of the store (block [7]) and the aluminum, clear glass, colored glass containers are emptied into respective compartments 116, 118, 120 of the box 100 (block [8]). The plastic containers are shredded (block [9]).

As aforesaid, when any one of the compartments 116, 118, 120 become filled, the hamper or box 100 is picked up by the third-party agent and is taken to transfer site or dump site (block [10]) the contents of each compartment are weighed and are unloaded (block [11]). The colored glass and clear glass containers are crushed and loaded on respective trailers to be sold to glass recyclers, as in blocks [12] and [13], while the aluminum is baled, and loaded onto vans or trucks and sold to an aluminum recycler, as in block [14].

If there is an anticipated need to change the volume capacity of the various material types of container, the positions of the bulkheads 122 can be reset, as in block [15]. Then, the hamper or box 100 is returned to the supermarket (block [16]).

All of the information entered into the computerized cash register 18 is stored, and the cash register 18 maintains a permanent record of the number of containers returned for each individual distributor. This is carried out by cross-referencing, in software, the respective brands with the appropriate distributor serving the particular supermarket (block [17]). From that information, at the end of each week the programmed data processer associated with the electronic cash register provides, for each respective distributor, a printout detailing the amount owed by the distributor to the outlet for refund and handling charges, as in block [18]. The distributor, for his part, is credited with or reimbursed for the salvage value of the bottles, cans, and other containers.

The purpose of weighing the contents of each of the compartments 116, 118 and 120 of the hamper or box 100 when the hamper is taken to the transfer station is to provide checks on the security of the procedure. Thus, an audit is carried out as in block [19], comparing the actual weight of the salvageable containers with a theoretical weight generated from the computerized cash register 18 to ascertain whether there has been any significant loss of containers between redemption and salvage.

While the invention has been described in detail with reference to a preferred embodiment, it should be understood that the invention is not limited to that embodiment and the invention can be embodied in many other forms without departing from the scope or spirit of the invention, as defined in the appended claims.

We claim:

1. A method of redeeming and disposing of returnable empty beverage containers, including aluminum cans and glass bottles, returned to a return center on which containers when sold to a consumer the consumer has paid a refundable deposit and the beverage containers of particular brands having been provided from respective distributors to a retailer, a deposit having been credited to the respective distributor from the retailer for each of such full containers provided, said deposit being credited to said return center from each said distributor for each such empty beverage container of the respective brand, but without requiring physical return of the empty containers to the respective distributors, the method comprising the steps of:

(a) counting the containers delivered by the consumer to the return center by brand, size, and material;

(b) entering the count of containers of each brand, size, and material as derived from the previous step into a cash register input device associated with a programmed data processor;

(c) computing, for each said consumer, credit data with returned container information indicating the refund of deposit due the consumer in accordance with the counts as entered into the cash register input device;

(d) providing the consumer with said credit data;

(e) sorting the redeemed glass and aluminum containers according to material without regard for brand;

(f) sorting the redeemed glass containers so sorted into receptacle bins provided therefor at said return center;

(g) placing the redeemed aluminum can containers into a can crushing unit at said beverage return center, which automatically crushes said cans to reduce their volume and deposits the same in a crushed can receptacle bin;

(h) transferring the glass containers and the crushed cans in said bins to respective hamper means situated away from the return center;

(i) disposing of the containers transferred to said hamper means;

(j) computing in said data processor the total number of empty containers of each respective brand returned to aid return center by said consumer; and (k) associating the number of returned containers of each brand, and computing in said data processor a credit due to the return center for the total of returned empty containers of the brands distributed by said distributor and returned to said return center.

2. The method of claim 1 wherein said hamper means includes a compartmentalized hamper having movable bulkheads that divide said hamper into compartments which are lockable, the bulkheads being adjustable to change the relative size of the respective compartments to conform with the proportions of containers of the respective types of materials.

3. The method of claim 2, further comprising the step of:

(l) auditing the results of the above steps (j) and (k) by
  (i) computing a theoretical weight of each said hamper compartment based on the numbers of containers of each said type of material returned, as based on the information entered on said computerized cash register;
  (ii) weighing the contents of each hamper compartment when filled with said returned containers to measure the actual weight thereof; and
  (iii) printing the actual and theoretical weights for a comparison therebetween.

4. The method of claim 2 wherein said hamper has an end door and said bulkheads are suspended and are locked against swinging by a lock member.

5. The method of claim 4 wherein weighing of the contents of the hamper compartments is carried out by (1) weighing the full hamper;
(2) releasing said end door and dumping the contents of the compartment defined between it and the next of said bulkheads;
(3) weighing the hamper again;
(4) releasing the lock member of said next bulkhead permitting it to swing when the hamper is dumped, and then dumping the contents of the compartment defined between said bulkhead and the next successive bulkhead;
(5) weighing the hamper again; and
(6) successively releasing each remaining bulkhead, dumping the contents of the compartment behind it, and weighing the hamper again until all said compartments of the hamper have been emptied, the weight difference between successive weighings giving the measured actual weight of the contents of each said compartment.

6. The method of claim 2 wherein said glass containers are placed into said receptacles and are transferred from the receptacles to the respective locked compartments without crushing or fracturing a substantial number of them.

7. The method of claim 1 wherein said can crushing unit has a vibratory hopper to receive said redeemed aluminum can containers, including vibrating means for feeding said aluminum can containers from the hopper to an inlet of the can crushing unit, and a compartment beneath the can crushing unit wherein said crushed can receptacle bin is reposed.

8. A compartmentalized hamper for storage, transport, and disposal of beverage containers of three or more types of material which are to be maintained segregated in said hamper, comprising an elongated box having a front end, side walls, a bottom, a top, and a rear end, said rear end being formed as a lockable door hinged to one or more of said side walls, bottom, and top, said top having a plurality of lockable compartment doors thereon along its length for access to the interior of the box, and said front end and bottom including means permitting loading of said box onto a truck bed for transport and disposal of the containers in said box;

a plurality of movable bulkheads disposed across said box defining, between successive ones thereof and between bulkheads and the front and rear ends, compartments for the containers of respective types of material;

means permitting the position of the bulkheads to be moved forward or rearward along the box to conform to the volume ratio of the respective material types of containers in said compartments; and means selectively permitting said bulkheads to swing open upwards and to the rear when the hamper is tilted rearward so that successive ones of said compartments, from the rear end to the front end of the box, can be emptied serially.

9. The compartmentalized hamper of claim 8 wherein each said bulkhead includes pivot bar means attached to the bulkhead at a top portion thereof and extending laterally outwards, said box including respective pivot means on opposite side walls and movable between a plurality of spaced positions for receiving and holding the pivot bar; and said selective restraining means including a restraining lock member insertable into an aperture in a respective one of said bulkheads and a plurality of mounting apertures in said side walls in vertical registry with said pivot means spaced positions, through which said lock member is inserted to restrain said bulkhead.

10. The compartmentalized hamper of claim 9 wherein said pivot means include angle members mounted on side walls of said box near a top thereof and each including a projecting horizontal flange having pairs of openings along its length, and associated pivot members each formed of a bar and two projecting fingers thereon, the fingers each fitting through respective ones of the openings of said pairs of openings.

11. The compartmentalized hamper of claim 10 wherein said pivot member is a generally F-shaped member.

12. A can crushing device for reducing the volume of deposit non-refillable metal containers which are returned to a beverage return center for redemption of deposit on said metal containers, comprising a can crushing unit having a top-feeding inlet for uncrushed cans and a can crusher outlet for crushed cans; a vibratory hopper on said can crushing unit and having an open top into which the redeemed cans returned to said return center are randomly placed, having an outlet feeding the inlet of said can crushing unit, and vibratory means for imparting vibratory motion to said hopper to facilitate movement of said cans in said hopper generally downwards towards said can crushing unit and to prevent jamming of the cans in said hopper; and a removable receptacle disposed beneath said can crusher outlet for receiving the crushed cans.

13. A can crushing device as in claim 12 wherein said hopper includes a shell having an open top and an outlet at its bottom connecting to said inlet of the can crushing unit, and a plurality of baffles disposed between the top and the bottom of the shell for guiding the cans to said outlet.

14. A can crushing device as in claim 12 wherein said vibrating means includes a vibrator device connected to an underside of one of said baffles.

15. A can crushing device as in claim 12 including a safety interlock switch permitting operation of said can crushing unit only when said hopper is positioned in place thereon.

16. A can crushing device as in claim 12 in which said can crushing unit includes an inner rotating cylinder and an outer stationary cylinder having an axis off the axis of the inner cylinder, and means guiding the cans into the space between the inner and outer cylinders.

17. A can crushing device as in claim 12 including a housing for said unit and having a closable compartment beneath said unit in which said removable receptacle is reposed.

18. A can crushing device as in claim 12 and further comprising a beverage return counter adjacent said device including a counter horizontal surface, with spaced openings therethrough; a plurality of receptacle bins disposed beneath said counter at the locations of said openings to receive clear glass, colored glass, and plastic redeemed containers, respectively; and a computerized cash register having means for entering the brand and material type of each container that is redeemed at said beverage return counter.

19. A method of redeeming and disposing of returnable empty beverage containers, including aluminum cans and glass bottles, returned to a return center and on which containers when sold to a consumer, the consumer has paid a refundable deposit and the beverage containers of particular brands having been provided from respective beverage distributors to a retailer, a deposit having been credited to the respective distributor from the retailer for each of such full containers provided, said deposit being credited to said return center from each said distributor for each such empty beverage container of the respective brand, but without requiring physical return of the empty containers to the respective distributors, the method comprising the steps of:

(a) counting the containers delivered by the consumer to the return center by brand, size and material;

(b) entering the count of containers of each brand, size, and material as derived from the previous step into a cash register input device associated with a programmed data processor;

(c) computing, for each said consumer, credit data with returned container information indicating the refund of deposit due the consumer in accordance with the counts as entered into the cash register input device;

(d) providing the consumer with said credit data;

(e) sorting the redeemed glass and aluminum containers according to material without regard for brand;

(f) placing the redeemed glass containers so sorted into receptacle bins provided therefor at said return center;

(g) placing the redeemed aluminum can containers into a can receptacle bin;

(h) transferring the glass containers and the cans in said bins to respective hamper means situated away from the return center;

(i) disposing of the containers transferred to said hamper means;

(j) computing in said data processor the total number of empty containers of each respective brand returned to aid return center by said consumer; and (k) associating the number of returned container of each brand, and computing in said data processor a credit due to the return center for the total of returned empty containers of the brands distributed by said distributor and returned to said return center.

20. The method of claim 19 wherein said hamper means comprises locked compartments of an exterior compartmentalized hamper having movable bulkheads dividing said locked compartments from one another.

* * * * *

UNITED STATES PATENT AND TRADEMARK OFFICE
CERTIFICATE OF CORRECTION

PATENT NO. : 4,829,428

DATED : May 9, 1989

INVENTOR(S) : David H. Weitzman and Jeffrey M. Young

It is certified that error appears in the above-identified patent and that said Letters Patent is hereby corrected as shown below:

Col. 9, line 16, please change "sorting" to --placing--.

Col. 12, line 46, please change "container" to --containers--.

Signed and Sealed this

Sixteenth Day of January, 1990

Attest:

JEFFREY M. SAMUELS

Attesting Officer     Acting Commissioner of Patents and Trademarks